J ADAMS.
Shovel-Plow.
No. 16,260.
Patented Dec. 23, 1856.
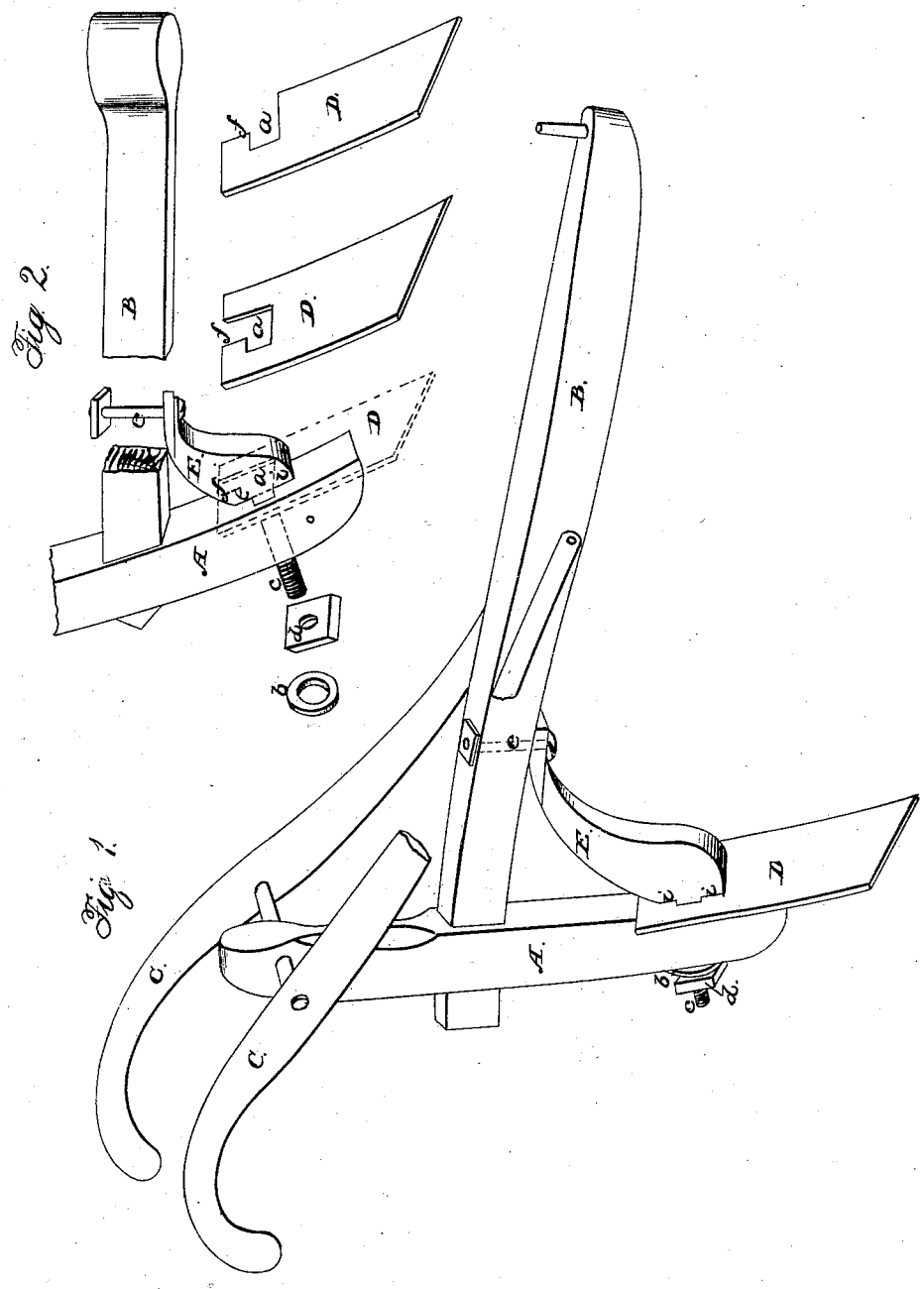

UNITED STATES PATENT OFFICE.

JONATHAN ADAMS, OF EATONTON, GEORGIA.

IMPROVEMENT IN PLOWS.

Specification forming part of Letters Patent No. 16,260, dated December 23, 1856.

*To all whom it may concern:*

Be it known that I, JONATHAN ADAMS, of Eatonton, in the county of Putnam and State of Georgia, have made a new Improvement upon the Common Plow built upon the Scooter plan; and I do hereby declare that the following is a full and exact description thereof, reference being had to the accompanying drawings, and to the letters and figures of reference marked thereon, in which—

Figure 1 represents a perspective view of my plow. Fig. 2 represents a fragmentary view of the same to more clearly show its several parts.

Similar letters of reference, where they occur in the separate figures, denote like parts of the plow in each.

My invention relates to certain improvements in what is known as the "Scooter" plow; and it consists in the manner in which I construct and unite the share, stock, and brace, so as to make the plow a convertible one with the very greatest facility.

To enable others skilled in the art to make and use my invention, I will proceed to describe the same, with reference to the drawings.

A represents the stock, B the beam, and C C the handles, of a plow, which may be of wood, and put together substantially in the manner shown in Fig. 1. The stock A is slightly curved, so that its face, against which the share, hoe, or mold-board D rests, shall be concave.

E is a curved brace extending from the underside of the beam, and having upon its lower end, which bears against the share D, a square shank, which passes through a square hole, *a*, in the share, and also through the stock A, and is secured behind said stock by a washer, *b*, and nut *d*, run onto a screw-thread, *c*, cut on said shank. That end of the brace E which bears against the beam B is also firmly connected to the beam by a screw-bolt, *e*, or otherwise to give rigidity to the plow.

The share D (which might more properly be termed the "mold-board," though performing the function of the share and mold-board of the ordinary plow) is made in the form shown more particularly in Fig. 2, with a slot, *f*, cut out from the mortise *a*, so that removing one kind of mold-board and replacing another does not require the taking out of the shank which passes through it, it being only necessary to loosen the nut *d*, and then by a movement similar to the undoing of a bayonet it is taken off, and another by a reversed movement put on, and the nut again run up, and the plow is ready for use.

The mold-board D is not of course held to the stock A by the square shank alone passing through a square hole in said mold-board, though this aids in holding it, for it mainly prevents the mold-board from turning.

On the end of the brace E are square shoulders *i i*, which, when the nut *d* is run up, holds the mold-board tight between the stock A and said brace, and thus said mold-board is rigidly held in its place.

Having thus fully described the nature of my invention, what I claim therein as new, and desire to secure by Letters Patent, is—

The peculiar manner of holding the slotted mold-board, share, or hoe to the stock A—viz., by means of the curved brace E with its shank and shoulders extending from the beam B and against and through the hoe and stock, as herein set forth.

JONATHAN ADAMS.

Witnesses:
ALFRED H. COATES,
WILLIAM A. DAVIS.